(12) United States Patent
Clark et al.

(10) Patent No.: US 6,168,811 B1
(45) Date of Patent: Jan. 2, 2001

(54) FORTIFIED EDIBLE COMPOSITIONS AND PROCESS OF MAKING

(75) Inventors: Douglas Clark; Elizabeth Gillis, both of Battle Creek; Harold Gobble, Richland; Neal Francisco, Olivet; James Kincaid, Battle Creek, all of MI (US)

(73) Assignee: Kellogg Company, Battle Creek, MI (US)

( * ) Notice: Under 35 U.S.C. 154(b), the term of this patent shall be extended for 0 days.

(21) Appl. No.: 09/335,071

(22) Filed: Jun. 17, 1999

Related U.S. Application Data

(60) Provisional application No. 60/089,744, filed on Jun. 18, 1998.

(51) Int. Cl.[7] ............................. A23L 1/302; A23L 1/304
(52) U.S. Cl. ..................... 426/74; 426/453; 426/455; 426/458; 426/464; 426/620; 426/648
(58) Field of Search .................... 426/74, 620, 648, 426/453, 455, 458, 464

(56) References Cited

U.S. PATENT DOCUMENTS

| | | |
|---|---|---|
| 3,035,985 | 5/1962 | Stoyle . |
| 3,037,911 | 6/1962 | Stoyle . |
| 3,042,526 | 7/1962 | Spiess, Jr. . |
| 3,194,682 * | 7/1965 | Tippens ................................. 426/453 |
| 3,248,226 * | 4/1966 | Stewart ................................. 426/453 |
| 3,471,603 | 10/1969 | Patrick et al. . |
| 3,627,583 | 12/1971 | Troy . |
| 3,647,480 | 3/1972 | Cermak . |
| 3,767,824 | 10/1973 | Keyser . |
| 3,784,716 | 1/1974 | Spangler . |
| 3,860,733 | 1/1975 | Morse et al. . |
| 3,950,545 * | 4/1976 | Hayward et al. ....................... 426/74 |
| 3,992,555 | 11/1976 | Kovacs . |
| 4,478,857 | 10/1984 | Stauss . |
| 4,585,657 * | 4/1986 | Karwowski et al. ................. 426/453 |
| 5,098,723 | 3/1992 | DuBois et al. . |
| 5,236,920 | 8/1993 | Kilbridge, Jr. . |
| 5,258,189 | 11/1993 | Efstathiou . |
| 5,268,870 | 12/1993 | Efstathiou . |
| 5,445,837 | 8/1995 | Burkes et al. . |
| 5,468,506 | 11/1995 | Andon . |
| 5,514,387 | 5/1996 | Zimmerman et al. . |
| 5,643,623 | 7/1997 | Schmitz . |

FOREIGN PATENT DOCUMENTS

| | | |
|---|---|---|
| 359227252 | 12/1984 | (JP) . |
| 410215814 | 8/1998 | (JP) . |

* cited by examiner

*Primary Examiner*—Helen Pratt
(74) *Attorney, Agent, or Firm*—Fulbright & Jaworski, LLP

(57) ABSTRACT

This invention discloses an edible composition containing agglomerated granules which, when added to an edible composition, substantially do not alter its sensory characteristics and a process for producing such edible compositions. This invention also discloses the agglomerated granules that are added to these edible compositions.

15 Claims, No Drawings

FORTIFIED EDIBLE COMPOSITIONS AND PROCESS OF MAKING

This application contains the benefit of U.S. Provisionsl Application No. 60/089,744 filed Jun. 18, 1998.

BACKGROUND

The present invention relates to fortifying edible compositions with a fortificant or a combination of fortificants in such a way that the sensory characteristics of the edible compositions are substantially not affected by the fortification, and the edible compositions produced thereby.

Fortificants play a vital role in nutrition. Calcium, phosphorous, sodium, potassium, and chloride are required by the body in relatively large amounts and traces of copper, iron, zinc, cobalt magnesium, manganese, molybdenum, nickel, silicon, selenium and vandium are also essential for good nutrition. Since the body does not synthesize these materials, they must be supplied in the diet. *Modern Inorganic Pharmaceutical Chemistry*, Discher, Medwick and Bailey, Second Edition, page 393.

Generally, addition of a small amount of a fortificant or a mixture of fortificants to an edible composition (about less than 1% by weight of the composition) does not affect the overall sensory characteristics of the composition and can therefore be accomplished relatively easily. However, meeting the current U.S. recommended dietary allowance (USRDA) for most fortificants requires fortifying an edible composition with 1% or more of the fortificant or mixture of fortificants by weight of the composition, which affects the processing as well as the sensory characteristics of the fortified composition.

It was found that the addition of fortificants at these high levels can result in a composition having an off-color, off-texture and/or off-taste, all of which are unpleasing to the eye and palate. For example, sensory analysis showed that addition of calcium resulted in a final product with a chalky, less sweet taste, causing the fortified edible composition to score differently from a non-fortified control in a taste test.

Previously, workers in the field tried to mask the off-sensory characteristics associated with fortification by adding the fortificants at different points of the process for making the edible composition of choice. For example, U.S. Pat. Nos. 5,258,189 and 5,268,870 (Efstathiou) disclose fortifying a ready-to-eat (R-T-E) cereal with vitamin-mineral complexes by homogenously dispersing the complexes with a cooked cereal mass prior to piece forming and finish drying and U.S. Pat. No. 4,478,857 (Stauss) discloses adding vitamins and minerals to a milled corn and soy-bean flour.

Additional investigators found that while adding fortificants at the end of the processing produced less of an interference with the composition's sensory characteristics, adding substantial amounts of fortificants to the composition nonetheless presented off-taste and appearance problems.

Since most fortificants are a fine powder, it was suspected that the high surface area and disperseability of fortificant powders allowed them to interact with the senses to a noticeable degree. Prior practices attempted to overcome this problem by coating mineral particles with carriers such as fats and oils. U.S. Pat. No. 3,992,555 (Kovacs) discloses avoiding undesirable odor, color and flavor characteristics associated with mineral fortification by coating a mineral or a mixture of minerals with an assimilable fat. U.S. Pat. No. 3,767,824 (Keyser) and U.S. Pat. No. 3,784,716 (Spangler) describe coating a dried cereal with vitamins which are themselves coated with a fatty composition or a hard fatty acid. Similarly, U.S. Pat. No. 3,037,911 (Stoyle) discloses masking the off-flavors of water soluble vitamins by coating them with a fatty composition and U.S. Pat. No. 3,035,985 (Stoyle) describes rendering iron tasteless by coating it with a fatty composition. U.S. Pat. No. 3,860,733 discloses masking the taste of vitamin-mineral mixes by microencapsulation with a solvent-containing solution. U.S. Pat. No. 5,643,623 (Schmitz) discloses a health food product fortified with an antioxidant mixture integrated within a lipid containing core that prevents discoloration of the food product. U.S. Pat. Nos. 5,445,837 and 5,468,506 disclose fortifying foods with a bioavailable source of calcium which is dissolved in a sweetener composition. U.S. Pat. No. 5,514,387 discloses enriching dough with calcium by admixing emulsifying amounts of a fatty acid ester and a stearoyl lactylate.

All of the prior efforts to mask or reduce the disagreeable sensory characteristics associated with fortification involved coating or encapsulating the fortificants so as to prevent the interaction ofthe fortificants with the senses. The problem with this approach is that it is not cost effective. Coating agents are expensive and the encapsulation process can use spray drying or fluid bed granulating which requires high energy use.

The present invention addresses this problem by providing a cost effective process of fortifying an edible food composition substantially without altering the sensory characteristics of the edible composition and by providing the edible food composition made thereby.

SUMMARY

The present invention relates to agglomerated granules which, when added to an edible composition, substantially do not alter its sensory characteristics. The invention also relates to an edible composition to which these agglomerated granules are added. Further, the invention relates to a process for producing an edible composition containing agglomerated granules which substantially do not change the sensory characteristics of the composition comprising agglomerating fortificant particles with a binding/masking agent and adding the particles to the edible composition.

Other embodiments of the present invention are further described hereinbelow.

DESCRIPTION

The present invention relates to the discovery that fortificant particles can be agglomerated with a binding/masking agent, forming distinct agglomerated granules, which can also be referred to as "bits". Each agglomerated granule consists of agglomerated particles of a single fortificant or of a combination of fortificants. The terms "fortificant" and "fortificants" hereinafter refer to minerals that are required for nutrition such as, for example, calcium, zinc, iron or other transition metals; and to other fortificants that are required for nutrition such as, for example, vitamins or riboflavin.

Agglomeration, as is normally understood by those skilled in the art, refers to particle size enlargement. Agglomeration of fortificant particles into granules decreases the surface area, disperseability and solubility ofthe fortificants, which is thought to reduce their interaction with the senses. This is in contrast to coating fortificant particles, which does not reduce the surface area ofthe fortificants and which prevents rather than reduces the interaction ofthe particles with the senses. Agglomerating rather than coating fortificant particles allows the addition of higher amounts of fortificants to an edible composition substantially without affecting the sensory characteristics of the composition, such as, for example, its taste, smell, texture, mouthfeel, odor and color. That is, when an edible composition fortified with agglomerated fortificant particles is compared to an edible composition which is not fortified with fortificants, a trained sensory panel will not be able to detect a difference in the sensory characteristics of the two compositions at a 90% confidence level.

The binding/masking agent contemplated by the present invention includes but is not limited to syrup, most preferably corn syrup. The binding/masking agent both binds the fortificant particles together (thereby agglomerating them) and substantially masks any off-color, off-texture, or off-taste that would have otherwise resulted from the addition of a fortificant or fortificants to an edible composition.

The edible compositions of the present invention include any edible composition, preferably cereals, food bars, confections, breads, snacks, or vitamin supplements; more preferably cereals; and most preferably R-T-E cereals. The edible compositions preferably comprise up to about 2% of the fortificants by weight of the composition, most preferably between about 0.1% to about 2% by weight of the composition, and yet more preferably between about 0.5% to about 1% by weight of the composition.

The agglomerated granules of the present invention can be prepared using any agglomeration or granulation process known in the art, such as, for example, using pan pelletizing, pellet milling, compacting, extruding, drum dry/flake, drum/tumble mixer, a high speed mixer, or a mixer/granulator. Preferably, a fortificant powder, or a mixture of mineral powders, is mixed in an agglomerator/granulator. Subsequently, a binding/masking agent is added in an amount sufficient to produce agglomerated granules of the desired size. The resulting wet granules, called "green granules," are removed from the agglomerator/granulator and dried.

The green granules are white or off-white in color but can be darkened to different shades of brown or brown-grey by varying the temperature and time of the drying process. The drying process also reduces the moisture content of the granules to a level compatible with the edible composition of choice. This level is generally in the range of 0–6% moisture, more preferably 0.5–3% moisture.

Once the granules are dried to the desired color and moisture content, they are cooled and screened. The size of the granules is important in developing the desired sensory profile of the edible composition and varies depending on the composition. Generally, the granule size will range from 88 to 2000 microns, preferably 420 microns to 2000 microns, and most preferably 710 to 1680 microns. However, achieving the desired sensory profile of certain products may require granule size outside this range. It has been found that 700–1700 microns is the preferred size for cereal and 50–200 microns is the preferred size for edible compositions such as food bars. Techniques, such as sensory testing, for determining the desirable granule size for an edible composition of choice are known by those skilled in the art. Any oversize particles can be recycled by milling and rescreening and fines may be recycled back to the agglomerator/granulator and reprocessed into larger granules.

The agglomerated granules of the present invention can be further colored as desired, using any of the methods known in the art, using suitable agents such as FDC lake colors, riboflavin (which imparts a yellow color) or caramel colors. The agglomerated granules can also be flavored as desired, using any of the methods known in the art. Coloring and flavoring the agglomerated granules can be done at any point, before or after the drying process.

The use of agglomerated granules allows higher levels of fortification, substantially without altering the sensory characteristics of an edible composition, than can be achieved with the same fortificants in a powdered or coated state.

For example, a trained sensory panel was asked to compare the sensory attributes of three sugar coated cereal products. The control product was not fortified with fortificants, another product was fortified with fortificants in their powdered state and a third product was fortified with agglomerated fortificant particles (agglomerated granules). Both fortified products contained comparable levels of calcium, zinc and iron as determined by chemistry analysis and the cereal base used for all three products was identical. The results of this test showed that the sensory attributes of the product fortified with agglomerated granules were substantially the same as those of the control product whereas a change in the sensory attributes of the product fortified with powdered fortificants was detected. Table 1 shows the mean scores for the sensory attributes of each product tested. Means with the same letter are not significantly different at a 90% confidence level.

TABLE 1

| Sensory Attribute | Control Product (Not Fortified) | Fortified Product (Agglomerated fortificant particles) | Fortified Product (Powdered fortificant particles) |
| --- | --- | --- | --- |
| Overall Intensity | 9.9a | 9.6a | 8.5b |
| Sweet | 9.3a | 9.1a | 8.5b |
| Grain | 4.3a | 3.8a | 2.7b |
| Astringent | 3.3a | 3.0a | 2.5b |
| Metallic | 0.1a | 0.1a | 0.6b |
| Oily coating | 0.9a | 0.9a | 2.0b |
| Mouth roughness | 1.3a | 1.3a | 2.8b |

Fortification with agglomerated granules can be performed at any stage of the process for making an edible composition. When the edible composition is an R-T-E cereal, the process generally involves a coating step wherein the cereal is coated with a binding or other agent to, for example, achieve a longer bowl-life. In this case, it is preferred that fortification occur during or immediately after the coating step to minimize degradation of the agglomerated granules. An added advantage is that the granules, which can be colored and/or flavored, can be sprinkled on the coated cereal, adhering thereto.

The following examples describe preferred embodiments of the invention. It will be understood that the examples provided herein are illustrative and do not limit the scope of the invention.

Agglomerated Granule Production

EXAMPLE 1

A Cuisinart Food Pro was charged with mineral powders according to the following formula:

| | |
| --- | --- |
| Calcium Carbonate | 400 grams |
| Zinc Oxide | 7.5 grams |
| Corn Syrup, 62DE | 214 grams |

The Cuisinart was run for 30 seconds to dry mix the powders. Corn Syrup, 62 Dextrose Equivalent (62DE), was heated to 228° F. and added dropwise over 20 minutes. During the last 5 minutes corn syrup addition was slowed as an exotherm was generated and the powders began to rapidly granulate. After all the corn syrup was added, the mixer was run for 3 minutes. The granules were then placed on an aluminum sheet and placed in a gas fired oven set to 275° F. for 14 minutes. The granules were then cooled and screened to a size of 710 by 1680 microns.

EXAMPLE 2

A 58 liter Stephan Mixer was charged with mineral powders according to the following formula:

| | |
|---|---|
| Calcium Carbonate | 42.96 lbs |
| Zinc Oxide | 4.783 lbs |
| Corn Syrup, 62DE | 10.8 lbs |

The blades in the Stephan Mixer were inverted and cooling water was supplied at 50° F. The powders were charged to the mixer and the lid was closed. The scraper blade was turned on followed by the main blade at 2000–3000 rpm. The powders were mixed for 30 seconds. Corn Syrup, 62DE was heated to 215° F. in a jacketed scrapped surface kettle (available from Lee Industries). Once heated, the corn syrup was transferred to a pumping system equipped with a Micro Motion mass flow meter. The corn syrup was added at 0.5 to 2 lb/min until 10.8 lbs were added. Mixing continued for 2–7 minutes after addition of the corn syrup, until proper granulation had occurred. The granules were then placed in a perforated stainless steel vat. Hot air at 260° F. was blown across the perforations and the product was allowed to dry and color over 14 minutes. The product was then transferred to another vat and cooled with ambient air. The material was then screened using a 24" Sweco with 710 by 1680 microns. The product was collected and particles of a size greater than 1680 microns were milled using a co-mill with a greater than 8 mesh screen. The oversize fractions were recycled through the sweco and the 710 by 1680 micron fraction was recovered as product. The less than 710 microns fraction was discarded. The 710 by 1680 microns fraction was reserved for use in coating a cereal product.

EXAMPLE 3

A Cuisinart Food Pro was charged with mineral powders according to the following formula:

| | |
|---|---|
| Calcium Carbonate | 400 grams |
| Corn Syrup, 42 HFCS | 200 grams |

The Cuisinart was run for 30 seconds to dry mix the powders. High Fructose Corn Syrup (42 HFCS) was heated to 100° F. and added dropwise over 20 minutes. During the last 5 minutes addition of the corn syrup was slowed as an exotherm was generated and the powders began to rapidly granulate. After all the corn syrup was added, the mixer was run for 3 minutes. The granules were then placed on an aluminum sheet and placed in a gas fired oven set to 275° F. for 14 minutes. The granules were then cooled and screened to a size of 710 by 1680 microns.

EXAMPLE 4

A Cuisinart Food Pro was charged with mineral and vitamin powders according to the following formula:

| | |
|---|---|
| Calcium Carbonate | 180.44 grams |
| Magnesium oxide | 141.04 grams |
| Retinyl Palmitate | 8.14 grams |
| B1-HCL | 2.68 grams |
| Riboflavin | 2.47 grams |
| B6-HCl | 20.64 grams |
| Folic Acid | 0.45 grams |
| B-12, 1% $H_2O$ Soluble | 23.06 grams |
| Niacimamide | 8.15 grams |
| Sodium Ascorbate | 61.63 grams |
| D-Calpant. | 0.0046 grams |
| Vitamin E Acetate Dry | 1.30 grams |
| Corn Syrup 62DE | 150.00 grams |

The dry powders were mixed in the Cuisinart for 30 seconds and then the liquid ingredients, other than corn syrup, were added. Subsequently, Corn Syrup, 62 Dextrose Equivalent (62DE), was heated to 228° F. and added dropwise over 20 minutes. During the last 5 minutes corn syrup addition was slowed as an exotherm was generated and the powders began to rapidly granulate. After all the corn syrup was added, the mixer was run for 3 minutes. The granules were then placed on an aluminum sheet and placed in a gas fired oven set to 250° F. for 12 minutes. The granules were then cooled and screened to a size of 240 by 2000 microns. High Fructose Corn Syrup (42 HFCS) was heated to 100° F. and added dropwise over 20 minutes.

Preparing Edible Compositions with Elevated Fortificant Levels

Preparation of edible compositions with elevated fortificant levels can be achieved through a batch process or a continuous process. In the preparation of cereal products with elevated fortificant levels, the cereal base can come in many forms, including but not limited to flakes, granola pieces, or extruded or puffed shapes such as loops or balls. The cereal may be single-grain or multi-grain.

EXAMPLE 5

Using a batch process, a fortified single grain cereal is prepared having the following formulation:

| | |
|---|---|
| Cereal base: | 60% toasted flakes of corn grits |
| Syrup: | 39% sucrose (75–85° brix) |
| Minerals: | 1% agglomerated granules |

The prepared cereal base was loaded into a small kettle. While the kettle was rotated, heated syrup was sprayed onto the cereal base. Agglomerated granules prepared as described in any of the embodiments disclosed in Examples 1–3 were added to the cereal via a shaker can such as a grated cheese shaker. The product was then dried and cooled.

EXAMPLE 6

Using a batch process, a fortified multi grain cereal is prepared having the following formulation:

| | |
|---|---|
| Cereal base: | 78% multi grain extruded loop |
| Syrup: | 17% sucrose and HFCS (75–85° brix) |
| Minerals: | 5% granules |

The prepared cereal base was loaded into a small kettle. While the kettle was rotated, heated syrup was sprayed onto the cereal base. Agglomerated granules prepared as described in any of the embodiments disclosed in Examples 1–3 were added to the cereal via a shaker can such as a grated cheese shaker. The product was then dried and cooled.

EXAMPLE 7

Using a continuous process, a fortified single grain cereal is prepared having the following formulation:

| | |
|---|---|
| Cereal Base: | 50–150 (lbs/min) corn flakes |
| Syrup: | 30–100 (lbs/min) sucrose (75–85° brix) |
| Minerals: | 0.5–2.5 (lbs/min) agglomerated granules |

The prepared cereal base is continuously fed into a rotating drum. Heated syrup is sprayed onto the base product as it tumbles in the drum. The agglomerated granules, prepared as described in any of the embodiments disclosed in Examples 1–3, are also metered into the drum, using either a screw conveyor or a pneumatic feeder, so that they contact the cereal just after it has been coated with the syrup. The agglomerated granules adhere to the coated base. The product is then dried and cooled.

EXAMPLE 8

Using a continuous process, a fortified multi grain cereal is prepared having the following formulation:

| | |
|---|---|
| Cereal Base: | 100–200 (lbs/min) multi grain extruded loop |
| Syrup: | 25–51 (lbs/min) sucrose and HFCS (75–85° brix) |
| Minerals: | 7–12 (lbs/min) agglomerated granules |

The prepared cereal base is continuously fed into a rotating drum. Heated syrup is sprayed onto the base product as it tumbles in the drum. The agglomerated granules, prepared as described in any of the embodiments disclosed in Examples 1–3, are also metered into the drum, using either a screw conveyor or a pneumatic feeder, so that they contact the cereal just after it has been coated with the syrup. The agglomerated granules adhere to the coated base. The product is then dried and cooled.

It will be understood that the specification and examples are illustrative of the present invention and that other embodiments within the spirit and scope of the invention will suggest themselves to those skilled in the art. All references cited herein are incorporated by reference.

What is claimed is:

1. A ready-to-eat cereal coated with agglomerated fortificant particles comprising a fortificant and an agglomerating agent that masks the taste of the fortificant which, when added to the edible composition, substantially do not alter its sensory characteristics.

2. The ready-to-eat cereal of claim 1, wherein the agglomerated fortificant particles further comprise a second fortificant.

3. The ready-to-eat cereal of claim 1, wherein said fortificant is selected from the group consisting of calcium, zinc and iron.

4. The ready-to-eat cereal of claim 3, wherein said fortificant is calcium.

5. A process for producing a ready-to-eat cereal containing agglomerated fortificant particles which substantially do not change the sensory characteristics of the cereal comprising agglomerating the fortificant particles selected from the group consisting of vitamins and minerals with an agglomerating agent that masks the taste of the fortificant and adding the agglomerated fortificant particles to the cereal.

6. The process according to claim 5, wherein the agglomerating agent is a syrup.

7. The process according to claim 5, wherein the fortificant is selected from the group consisting of calcium, zinc and iron.

8. The process according to claim 7, wherein said fortificant is calcium.

9. A ready-to-eat cereal containing an agglomerated granule comprising a fortificant selected from the group consisting of vitamins and minerals and an agglomerating agent that masks the taste of the fortificant which, when added to the ready-to-eat cereal, substantially does not alter its sensory characteristics.

10. The ready-to-eat cereal of claim 9, wherein the size of said granules varies depending on the ready-to-eat cereal to which the granules are added.

11. The ready-to-eat cereal of claim 10, wherein the agglomerated granules have a size of from about 88 to about 2000 microns.

12. The ready-to-eat cereal of claim 10, wherein the agglomerated grannules have a size of from about 420 to about 2000 microns.

13. The ready-to-eat cereal of claim 10, wherein said agglomerated granules have have a size of from about 50 to about 200 microns.

14. The ready-to-eat cereal of claim 9, wherein said granules are colored.

15. The ready-to-at ceral of claim 9, wherein said granules are flavored.

* * * * *